UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

LUMINOUS OR FLAMING ARC ELECTRODE.

1,049,854.   Specification of Letters Patent.   Patented Jan. 7, 1913.

No Drawing.   Application filed July 9, 1910. Serial No. 571,105.

*To all whom it may concern:*

Be it known that I, JOSEPH L. R. HAYDEN, a citizen of the United States, residing at Schenectady, county of Schenectady, State of New York, have invented certain new and useful Improvements in Luminous or Flaming Arc Electrodes, of which the following is a specification.

My invention relates to arc lighting and comprises particularly improvements in the composition of electrodes containing some form of titanium and fluorin chemically combined with an earth metal.

In the type of arc lamp in which carbon electrodes are used the crater formed at the tip of the positive electrode becomes highly incandescent, and it is this crater which furnishes the major portion of the light, about 85%, while the arc itself furnishes only 10 or 15% of the light. It has heretofore been found that the light given by the arc itself can be greatly increased by impregnating the carbon electrodes with light giving salts, which salts enter into the arc and become luminous producing what is known in the art as a flaming arc. In this type of lamp the arc is formed by the carbon of the electrodes, as truly as when the electrode is composed entirely of free carbon. In this type of lamp the impregnated electrode is the positive. It has also been found that an electrode may be formed entirely of materials other than free carbon, particularly of metallic compounds such as magnetite or titanium carbid, and in this type of electrode such metallic compounds both form the arc and produce the light, forming what is known as a luminous arc. In this type of lamp the negative electrode contains the luminous arc material. It has also been found that electrodes which contain some form of titanium, particularly titanium carbid, that enters into the arc, produce an arc giving an exceptionally white and efficient light. It has been found, however, that such arcs are unsteady and give a flickering light that is objectionable. This characteristic is apparently due to the variable amount of titanic material that enters into the arc from time to time. Furthermore the amount of light often very much decreases after the lamp has been operating for a time, and when the electrode is mainly composed of titanium carbid the arc may even become so weak as to go out altogether.

I have found that I can overcome these objectionable features in an electrode containing or consisting of titanic material by introducing fluorin as an acid forming constituent in a metallic compound, in some form into the electrode, and this may be done either in the flaming or luminous type of lamp. The combined fluorin thus introduced overcomes the objectionable features above indicated and also prevents rectification which occurs in an arc formed by electrodes containing titanic material when used with alternating currents.

Titanium fluorid itself is unstable at ordinary temperatures, so that it is impossible to introduce this compound into the electrode. It thus becomes necessary to introduce the fluorin into the electrode in combination with a metal other than titanium as a carrier for the fluorin and this may be done either by using as the metallic component of the fluorin compound a metal or metals other than titanium, or it may consist in part of titanium itself. If stable titanium-fluorin compounds could be obtained, these would best serve the object of my invention. The problem is to introduce fluorin in some form into the arc combined with some metal or metals that will detract as little as possible from the efficiency of the arc. Of the fluorids of metals other than titanium the alkaline metal fluorids such as the fluorids of sodium and potassium are comparatively conductive in the arc, so that when used, except in small quantities, they carry practically all of the current and thus detract from the luminosity of the arc. The alkaline earth metal fluorids and the earth metal fluorids however, are not so conductive in the arc as the alkaline metal fluorids and therefore a larger proportion of fluorin may be introduced into the electrode in combination with these metals than when combined with the alkaline metals, without carrying most of the current and correspondingly decreasing the effect of the titanic material in the arc.

Of the alkaline earths calcium appears to be the most efficient. Calcium fluorid produces a yellow light and when such light is desired calcium fluorid is very satisfactory. Barium and magnesium, however, may be used, but I have found that they are less efficient than calcium, although they give a white light. In case a white light is desirable, cerium fluorid is the most efficient of the fluorids which contain no titanium. Other earth fluorids, however, such as aluminum fluorid, cryolite, which is the double fluorid of sodium and aluminum, and thorium may be used. I have also made a good electrode by the addition of chromium fluorid to an electrode containing titanic material. It is to be understood therefore that I am not confined to the three classes of substances above indicated as carriers for the fluorin.

In the fluorids above indicated no titanium is used as a carrier in the metallic component. By using a titano-fluorid of the alkaline earth or earth metals I am enabled to increase the proportion of fluorin relative to the metal or metals other than titanium. Thus instead of using calcium fluorid, $CaF_2$, I may use calcium titano-fluorid, $CaTiF_6$, and thereby greatly increase the proportion of fluorin relative to the metal other than titanium, in this case calcium. Similarly when a white light is desired instead of using cerium fluorid $CeF_2$, I may increase the proportion of fluorin to the metal other than titanium by using cerium titano-fluorid, $CeTiF_6$. In some cases it is unnecessary to introduce any other titanic material into the electrode than that which is used in combination with the fluorin, and I have made excellent electrodes composed entirely of carbon and cerium titano-fluorid.

The proportion of combined fluorin in the electrodes will vary according to the character of the lamp in which the electrode is to be used. For instance, in a low current long burning flame arc lamp, in which the electrode is consumed comparatively slowly, a large proportion of the fluorid, in some cases as much as 50 to 75 per cent. would be desirable, whereas, in a high current short burning lamp a small percentage, in some cases as small as 1 per cent. would be sufficient. Thus in a low current long burning flame lamp, in which cerium titano-fluorid is employed, I would preferably use 20 to 30 per cent. of the fluorid, while, in a high current short burning flame lamp, I would preferably use from 5 to 10 per cent. of the fluorid. It is to be understood, however, that the fluorid is equally applicable to electrodes containing titanium carbid as high as from 96 to 98 per cent., in which case 2 to 4 per cent. of cerium titano-fluorid operate satisfactorily. It will be understood, therefore, that the proportion of combined fluorin may vary anywhere from about 1 per cent. to 75 per cent. according to the character of the lamp and the conditions under which it is to be used.

While I have given as an example the specific compounds and the proportions thereof that enter into my electrode, I desire it to be understood that I am not limited to these specific compounds. For instance, while I have designated titanium carbid as the specific titanic material in an electrode for which combined fluorin is useful, it is clear that combined fluorin is equally useful in electrodes containing any other titanium compound, such as titanium oxid. Furthermore, as above indicated the titanic material may all be introduced into the electrode combined with the fluorin. Therefore, when in the claims I refer to titanic material and to combined fluorin, it is to be understood that the titanic material may appear either partially or entirely in a compound distinct from that with which the fluorin is combined or all of the titanium entering into the electrode may be combined with the fluorin.

What I claim as new and desire to secure by Letters Patent of the United States, is,—

1. An arc light electrode containing titanic material and fluorin chemically combined with an earth metal.

2. An arc light electrode containing titanic material and fluorin as an acid forming constituent in a cerium compound.

3. An arc light electrode containing titanic material and a titano-fluorid.

4. An arc light electrode containing titanic material and cerium titano-fluorid.

5. An arc light electrode containing titanium carbid and cerium titano-fluorid.

6. An arc light electrode composed of titanium carbid and cerium titano-fluorid.

7. An electrode containing fluorin chemically combined with titanium and an earth metal.

8. An electrode containing titanic material and fluorin chemically combined with titanium and an earth metal.

9. An arc light electrode containing titano-fluorid.

10. An arc light electrode containing cerium titano-fluorid.

In witness whereof, I have hereunto set my hand this 7th day of July, 1910.

JOSEPH L. R. HAYDEN.

Witnesses:
HELEN ORFORD,
BENJAMIN B. HULL.